United States Patent Office 3,553,089
Patented Jan. 5, 1971

3,553,089
RADIATION TREATMENT OF MATERIALS
Alan I. Mytelka, 12 Riviera Drive, Somerville, N.J. 08876, and Raymond M. Manganelli, 1053 Grove St., Elizabeth, N.J.
No Drawing. Filed Sept. 22, 1967, Ser. No. 669,695
Int. Cl. B01j 1/10
U.S. Cl. 204—157.1
4 Claims

ABSTRACT OF THE DISCLOSURE

Aqueous waste effluents containing organic materials dissolved or suspended therein are rendered more suitable for subsequent treatment and/or disposal by adjusting the pH to a value in the range 9–12 and subjecting the waste effluent to penetrative ionizing radiation in the presence of oxygen and in the presence of a multivalent metal cation, such as a ferrous ion. Desirably, a chloride ion is incorporated in the waste effluent during treatment. This treatment is particularly applicable to the treatment of the highly colored waste effluents produced in the manufacture of dyestuffs, especially azo dyestuffs.

---

This invention relates to the treatment of aqueous effluents by subjecting the same to penetrative ionizing radiation to render such effluents more suitable for subsequent treatment or disposal. More particularly, this invention relates to the treatment of aqueous waste effluents by subjecting such effluents to penetrative ionizing radiation, such as $Co^{60}$ gamma rays, so as to render such effluents more suitable for disposal into biological treatment plants, streams and the like without giving rise to any serious problems.

Water pollution has long been a serious problem. Many treatments suggested heretofore to alleviate or to overcome water pollution problems, such as may arise due to the discharge of industrial waste effluents into streams, have not been completely satisfactory. Either the treatments proposed heretofore have been too costly or have not been satisfactory. For example, biological methods have been proposed and are in use for the treatment of waste effluents, such as the treatment of domestic sewage. There are many industrial effluents, however, which contain substances either refractory or toxic to biological treatment. Also, biological treatment methods may not be useful in the treatment of highly colored waste effluents, such as sometimes are produced in the manufacture of dyestuffs.

Accordingly, it is an object of this invention to provide an improved process for the treatment of aqueous effluents so as to tender the same more suitable for subsequent treatment, such as a subsequent secondary treatment, which might involve a biological treatment, or for disposal.

Another object of this invention is to provide an improved process for the treatment of waste effluents, which treatment does not involve the addition of extraneous materials or chemicals in a substantial amount to the effluents undergoing treatment.

Another object of this invention is to provide an improved process for the treatment of industrial effluents, such as the waste water resulting from the manufacture of a dyestuff, e.g. an azo dyestuff.

How these and other objects of this invention are achieved will become apparent in the light of the accompanying disclosure. In at least one embodiment of the practice of this invention at least one of the foregoing objects will be achieved.

It has been discovered that aqueous effluents, such as aqueous industrial waste effluents, e.g. aqueous solutions and/or dispersions, are rendered more suitable for subsequent treatment and/or disposal when such effluents are subjected to pentetrative ionizing radiation. In the practice of this invention the pH of the aqueous effluents undergoing treatment by exposure to penetrative ionizing radiation is desirably in the alkaline range, such as a pH in the range from about 9 to about 12, more or less. The practice of this invention is also applicable to the treatment of acidic aqueous effluents, such as aqueous effluents having a pH in the range 1–5. Desirably, there is also incorporated in the aqueous effluent undergoing treatment a metal cation possessing several oxidation states, such as may be derived from a water soluble salt of a multivalent metal, e.g. ferrous sulfate or ferric sulfate.

The practice of this invention is particularly applicable to the treatment of aqueous effluents, such as dyestuff waste waters. It has been found that when dyestuff waste waters, such as the waste waters resulting from the manufacture of an azo dyestuff, are subjected to penetrative ionizing radiation, such as $Co^{60}$ gamma radiation, the effect of the ionizing radiation on the azo dyestuff waste water was to oxidize the organic solutes in the water, to decolorize the waste water, to remove organic carbon from solution and to decrease the aromaticity of the organic solutes remaining in solution following the radiation treatment. Furthermore, the resulting treated dyestuff waste water, initially refractory to biological treatment, becomes more readily biodegradable.

Also, it has been found that the addition of a metal cation with more than one oxidation state, e.g. $Fe^{2+}$ to $Fe^{3+}$, increases the efficiency of the radiation treatment, particularly the radiation treatment of dyestuff waste effluents. Also, it has been found that the radiation treatmen of dyestuff waste water which contains salts, such as water soluble chlorides, is enhanced by irradiating the dyestuff waste effluent under alkaline conditions as opposed to acid or neutral conditions.

The irradiation of the aqeuous effluents in accordance with this invention may be carried out in a continuous flow process or in a batch process or a combination thereof. Depending upon the materials present in the aqueous effluent and the results desired, the dosage rate and the total dosage to which the aqueous effluent is subjected may vary. For an aqueous effluent which contains refractory materials the total radiation dosage required to effect the desired results will be greater than the total required to effect desired results with respect to an aqueous effluent which contains less refractory materials. Futher, in order to decrease the time required to effect the radiation treatment in accordance with this invention it is desirable that the radiation treatment be carried out at a high level of radiation intensity or dosage rate. For practical and industrial applications, the dosage rate and the total dosage required to effect the desired treatment of the aqueous effluent should be accomplished within about 24 hours and preferably within a few hours and most desirably within the range 0.5–5.0 hours.

In the practice of this invention any suitable source for the penetrative ionizing radiation is applicable. A gamma ray emitting cobalt-60 source has been found to be particularly useful. Gamma rays are useful as the penetrative ionizing radiation in the practice of this invention since they have great penetrability, substantially greater than high energy alpha, beta and X-ray radiation which are also useful. Neutrons as the penetrative ionizing radiation are also satisfactory from the point of view of penetrability but their use in the practice of this invention is less desirable because of the tendency of the neutrons to induce radioactivity in materials exposed to them.

The penetrative ionizing radiation of the type useful in the practice of this invention may be supplied by naturally occurring radioactive materials, such as radium and its compounds which emit alpha, beta and gamma rays. Fission by-products of processes generating atomic power and/or fissionable materials which emit high energy gamma rays provide a highly desirable and abundant source of penetrative ionizing radiation suitable for use in the practice of this invention. These by-products include elements with atomic numbers ranging from 30 (zinc) to 63 (europium) and their compounds. Such by-products are formed in the course of converting uranium and thorium and other fissionable material in the atomic reactor. Also, materials made radioactive by exposure to neutron radiation, such as radioactive cobalt-60, europium-152, europium-154 or cesium-137 which emit gamma rays, are also useful. Devices for generating X-ray or high velocity electrons, such as electron accelerators, e.g. Van de Graff accelerators and betatrons are also useful for providing the penetrative ionizing radiation in the practice of this invention. In general, however, high intensity gamma radiation and its well known sources, such as nuclear fission products and materials made radioactive by neutron radiation, are preferred in the practice of this invention because of the relatively high penetrating power of the gamma rays and the availabilty and ease of application of these sources of gamma radiation.

The irradiation treatment of the aqueous effluents in accordance with this invention is usefully carried out at ambient temperatures, such as a temperature in the range from about 5° C. to about 25° C., more or less. If desired, the aqueous effluent undergoing treatment may be at a high or lower temperature, as low as about 0° C. and as high as 100° C., and higher, provided the conditions are such that the aqueous effluent undergoing treatment is maintained in the liquid phase.

As indicated hereinabove the radiation time and intensity, including total radiation dosage to which the aqueous effluent is subjected, depend upon the character and the nature of the aqueous effluent undergoing treatment, i.e. the composition of the aqueous effluent and the results sought to be effected by the radiation treatment. A radiation intensity of about 10,000–20,000,000 rads per hour (rad/hr.), such as a radiation intensity in the range 100,000–5,000,000 rad/hr. yields satisfactory results although, if desired, higher or lower levels of radiation intensity may be employed.

The waste effluents which are usefully treated in accordance with this invention include not only aqueous waste effluents derived from the manufacture of azo dyestuffs, but also other highly refractory and/or highly colored aqueous effluents. Examples of aqueous effluents which are usefully treated in accordance with the practice of this invention include waste waters derived from wool scouring plants, waste waters derived from the manufacture of organic chemicals, particularly waste waters derived from petroleum refineries which include petroleum sulfonates, waste waters derived from scrubbers employed for the extraction of volatilizable organic compounds from chemical process streams and gaseous effluents, domestic sewage effluents, effluents derived from the processing of natural materials, such as the waste water effluents of tanning plants, coal washing installations, sugar refineries, the processing of starchy materials, distilleries for the manufacture of alcoholic beverages including beer, waste effluents from the manufacture of pharmaceuticals and other highly specialized organic chemicals, such as effluents from the manufacture of pesticides, e.g. Dieldrin, Aldrin, Chlordane, DDT and Malathion, waste water from food processing plants, waste waters from plants engaged in the manufacture and/or processing of paper pulp, e.g. kraft mills. In general, waste waters which derive from the processing of organic materials and which contain a substantial amount of organic material dissolved therein, e.g. as little as 0.000001% by weight of dissolved or organic materials, are suitable for treatment in accordance with the practices of this invention.

The practices of this invention are described herein in accordance with one special embodiment, viz, the radiation treatment of azo dyestuff mother liquor derived from the manufacture of azo dyestuff identified as Colour Index Direct Red 79. The chemical, physical and biological properties of this waste effluent are set forth in Table I.

TABLE I (A) Chemical:
   (1) pH—9.8
   (2) COD—48,500 mg./l. as $O_2$
   (3) TOC—15,000 mg./l. as C
   (4) Total alkalinity—7,000 mg./l. as $CaCO_3$
   (5) Dye concentration—8,100 mg./l. as Direct Red 79

The chemical structure of the sodium salt of Direct Red 79 is:

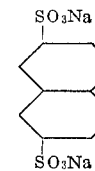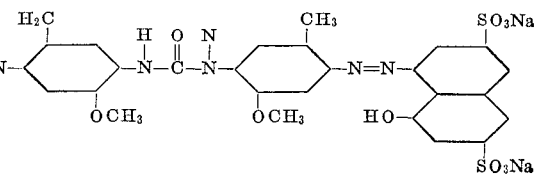

(B) Physical:
   (1) Solids:
      Total—93,900 mg./l.
      Settleable—None
      Non-settleable, volatile at 600° C.—25,000 mg./l.
      Non-volatile [1] at 600° C.—68,900 mg./l.
   (2) Color: [2]

| pH | Purity, percent | Dominant wavelength, mu | Hue | Luminance, percent |
|---|---|---|---|---|
| 4 | 18 | 613 | Orange-red | 59.6 |
| 9 | 20 | 613 | do | 57.2 |

[1] These non-volatile solids include NaCl, $Na_2CO_3$ and NaOH.
[2] Determined at a dilution of 1000:1 and a pathlength of 1.0 cm.

(C) Biological:
   (1) BOD 5 day 20° C. by the dilution technique:

| Waste Dilution: | $BOD_D$ mg./l. $O_2$ |
|---|---|
| 333:1 | 700 |
| 500:1 | 950 |
| 940:1 | 1,220 |
| 3,000:1 | 1,800 |

(2) Effect of the waste on microbial growth:

| Amount of waste in the growth medium: | Number of colonies |
|---|---|
| None | 330 |
| 2% by volume | 75 |

(3) BOD 5 day 20° C. by the manometric technique:

| Waste dilution | $BOD_M$, mg./l. $O_2$ | COD/$BOD_M$ |
|---|---|---|
| 1,000:1 with adapted seed | 24,000 | 2 |
| 100:1 with adapted seed | 24,800 | 2 |
| 10:1 with adapted seed | 650 | 76 |
| 2:1 with adapted seed | 32 | 1,500 |
| 100:1 with nonadapted seed | 1,000 | 50 |

The irradiation of the above-identified azo dyestuff waste effluent was carried out by means of 8 sealed $Co^{60}$ pencil sources in two hot cells. Hot cell #1 contained a total of approximately 3.8 kilo Curies of $Co^{60}$ and hot cell #2 contained approximately 1.5 kilo Curies of $Co^{60}$.

Six-hundred ml. of the azo dyestuff waste effluent were brought to a predetermined pH using solid sodium hydroxide or concentrated sulfuric acid. The solution was then poured into a one quart glass jar and placed in a wooden $Co^{60}$ pencil holder within the hot cell. Nitrogen was passed through the solution being irradiated to provide mixing as well as oxygen control during irradiation. After the desired radiation exposure the $Co^{60}$ pencils were removed and the gas flow stopped and the treated effluent stored in a refrigerator at approximately 1–3° C. for further testing.

Following the above-described procedure, full strength azo dyestuff waste effluent having the composition set forth in Table I was irradiated 24 hours at 0.3 megarad/hr. with nitrogen bubbled through the effluent. No change of chemical oxygen demand (COD) or change in color was observed. In another experiment the dyestuff waste effluent at a 1000:1 dilution and at an initial pH of 12.2 was irradiated for 23.5 hours at a rate of 0.3 megarad/hr. with air bubbled through the solution as indicated in the results reported in Table II.

0.3 megarad/hr. with a total dose of 7.2 megarads. Based upon the results reported in Table III, it was observed that at a pH of 12 with air present the change in COD per megarad absorbed was 60 while at a pH of 12 and with nitrogen bubbled through the sample and with both air and nitrogen bubbled through at a pH of 1 the change in COD per megarad absorbed was less than 20. From this it appears that the presence of air and alkaline conditions favored radiation-induced oxidation of the components of the waste.

TABLE III
Effect of pH, Oxygen, and Waste Concentration on Radiation-Induced Changes in the Waste [1]

| Gaseous environment | Waste dilution | pH Initial | pH Final | COD Initial, mg./l. $O_2$ | COD Final, mg./l. $O_2$ | COD/ megarad | Final color |
| --- | --- | --- | --- | --- | --- | --- | --- |
| $N_2$ | 1,000:1 | 1.1 | 1.1 | 42.6 | 11.4 | 4.3 | None. |
| $N_2$ | 100:1 | 1.0 | 1.3 | 485 | 424 | 8.5 | Light orange-yellow. |
| Air | 100:1 | 1.0 | 1.2 | 490 | 358 | 18.9 | Do. |
| $N_2$ | 100:1 | 12.0 | 11.8 | 496 | 407 | 12.3 | Do. |
| Air | 100:1 | 12.0 | 9.1 | 476 | 43 | 60.0 | None. |

[1] Dose rate 0.3 megarads/hr.
NOTE.—Total dose 7.2 megarads.

Since the pH of the solution during irradiation seemed to play an important role in the oxidation of the waste components a series of experiments was run varying the initial pH of the waste solution. The results of these tests are shown in Table IV. As indicated by the results reported in Table IV the irradiation of the test solution lowered its pH. For instance, when the initial pH of the test solution was 12.0 the pH after irradiation was 9.6.

TABLE IV
Effect of pH on Radiation-Induced Changes in the Waste [1]

| pH Initial | pH Final | COD Initial, mg./l.$O_2$ | COD Final, mg./l.$O_2$ | Total dose, megarads | COD/ megarad | Final color | Gaseous environment |
| --- | --- | --- | --- | --- | --- | --- | --- |
| 12.0 | 9.6 | 490 | 240 | 7.2 | 33 | None | Air. |
| 11.0 | 4.6 | 490 | 49 | 3.6 | 123 | do | Air. |
| 10.0 | 3.2 | 490 | 135 | 3.6 | 99 | do | Air. |
| 7.6 | 2.9 | 490 | 153 | 3.6 | 94 | do | Air. |
| 6.0 | 2.8 | 490 | 121 | 3.6 | 102 | do | Air. |

[1] Dose rate 0.15 megarads/hr.

Experiments were carried out to determine the effect of total radiation dosage. In these experiments the effluent was irradiated after dilution of approximately 100:1 and at a pH of 12.1 and at a dose rate of 0.174 megarads/hr. The gas bubbled through the effluent during irradiation had a composition of 40% oxygen and 60% nitrogen. The results of these tests are set forth in Table V.

TABLE V
Effect of Total Dose on the COD, TOC and Dye Concentration of the Waste

| Time of irradiation, hours | Total dose, megarads | COD, mg./l.$O_2$ Initial | COD, mg./l.$O_2$ Final | TOC[1] mg./l. C Initial | TOC[1] mg./l. C Final | Dye concentration, mg./l. Initial | Dye concentration, mg./l. Final |
| --- | --- | --- | --- | --- | --- | --- | --- |
| 0 | 0 | 481 | 481 | 150 | 150 | 79 | 79 |
| 1.0 | 0.17 | 481 | 441 | 150 | 137 | 79 | 33.5 |
| 2.0 | 0.36 | 481 | 381 | 150 | 135 | 79 | 18.0 |
| 4.1 | 0.72 | 481 | 325 | 150 | 104 | 79 | 4.0 |
| 8.0 | 1.39 | 481 | 252 | 150 | 106 | 79 | 1.0 |
| 14.7 | 2.56 | 481 | 186 | 150 | 86 | 79 | 0.3 |

[1] TOC=Total Organic Carbon.

As indicated in the results in Table II hereinbelow the treatment of the diluted effluent decreased its chemical oxygen demand (COD), its pH and color while increasing its biological oxygen demand (BOD).

TABLE II
Effect of Irradiation [1] on Aerated 1,000:1 Dilution Waste

| Dose megarads | pH | COD, mg./l.$O_2$ | BOD, mg./l.$O_2$ | COD/ BOD | Color |
| --- | --- | --- | --- | --- | --- |
| 0 | 12.2 | 49 | 1.8 | 27.2 | Red. |
| 7.1 | 11.6 | 19 | 11.2 | 1.7 | None. |

[1] Dose rate was 0.3 megarads/hr.

The effect of pH and oxygen and waste concentration during radiation treatment was also tested. In these tests the waste effluent solution was treated at a dose rate of The results reported in Table V, when plotted, indicate that as the total dose increased the percent reduction in dye concentration, COD and TOC increased. For example, when 2.56 megarads were absorbed, 61% of the initial COD had been oxidized, 43% of the initial TOC had been removed from solution and for all practical purpose all the dye had been destroyed. The data reported in Table V also leads to a conclusion that the oxidation of the dye in the waste proceeds in preference to and more readily than the oxidation of the other organic compounds present.

Tests were also carried out to determine the effect of total dose on the biodegradability of 100:1 diluted irradiated waste. The results of these tests are set forth in Table VI. The results of these tests show that not only does irradiation oxidize the waste and remove organic carbon from the solution but that those organic compounds remaining after irradiation are more biodegradable than the original compounds which were present. The results of Table VI, when plotted, show that increasing the dosage improves the biodegradability of the waste from an initial 5-day Warburg oxygen uptake value of 9 mg./l. $O_2$ with no irradiation to 85 mg./l. $O_2$ with 2.56 megarads of irradiation. At the same doses the COD/BOD ratio decreased from 53.5 to 2.2.

TABLE VI

Effect of Total Dose on the Biodegradability of 100:1 Dilution Irradiated Waste

| Total dose, megarads | COD | | $BOD_m$, mg./l. $O_2$ | $COD_{final}$ / $BOD_m$ |
|---|---|---|---|---|
| | Initial, mg./l. $O_2$ | Final, mg./l. $O_2$ | | |
| 0 | 481 | 481 | 9 | 53.5 |
| .17 | 481 | 443 | 21 | 21.0 |
| .35 | 481 | 381 | 35 | 10.9 |
| .72 | 481 | 325 | 52 | 6.3 |
| 1.39 | 481 | 252 | 67 | 3.9 |
| 2.56 | 481 | 186 | 86 | 2.2 |

Further tests were carried out to determine the effect of pH on radiation induced changes in the waste. The results of these tests are set forth in accompanying Table VII.

Tests were carried out to determine the effect of waste concentration during irradiation. These tests were carried out at a pH of 12.1, at a dose rate of 0.168 megarad per hour and a total dosage of 0.67 megarad. 100% oxygen was bubbled through the test solution during irradiation and the waste concentration during irradiation was varied.

TABLE IX

Effect of Waste Concentration on Radiation-Induced Changes in the Waste

| Approximate waste dilution | COD, mg./l $O_2$ | | TOC, mg./l. C | | Dye, mg./l. | |
|---|---|---|---|---|---|---|
| | Initial | Final | Initial | Final | Initial | Final |
| 500:1 | 98 | 64.6 | 30 | 26 | 19.5 | 0 |
| 200:1 | 245 | 166 | 75 | 68 | 39.5 | 0 |
| 100:1 | 490 | 373 | 150 | 134 | 79 | 4 |
| 50:1 | 980 | 813 | 300 | 276 | 158 | 25.5 |

Tests were carried out to determine the effect of dose rate during the irradiation treatment. In these tests dose rates of 0.064, 0.167 and 0.334 megarad per hour were employed at a pH of 12.1 while 100% oxygen was bubbled through the test solution. Additionally, the waste concentration in the test solutions was varied by a factor of 10 to determine the effect of concentration on dose rate. The total dose was directly proportional to the concentration. Thus, a 100:1 dilution received five times the dose

TABLE VII

Effect of pH on Radiation-Induced Changes in the Waste

| pH | Dose rate, megarads/hr. | Total dose, megarads | COD, mg./l. $O_2$ | | TOC, mg./l. C | | Dye, mg./l. | | $BOD_m$, mg./l. $O_2$ |
|---|---|---|---|---|---|---|---|---|---|
| | | | Initial | Final | Initial | Final | Initial | Final | |
| 13.0 | 0.169 | 0.68 | 485 | 395 | 148 | 140 | 81 | 2 | 28 |
| 12.0 | 0.169 | 0.68 | 485 | 381 | 148 | 132 | 81 | 4 | 55 |
| 11.1 | 0.171 | 0.68 | 485 | 376 | 148 | 130 | 81 | 13 | 50 |
| 9.2 | 0.169 | 0.68 | 485 | 396 | 148 | 146 | 81 | 35.5 | 38 |
| 5.5 | 0.169 | 0.68 | 485 | 404 | 148 | 136 | 81 | 45 | 34 |
| 3.3 | 0.167 | 0.68 | 485 | 405 | 148 | 144 | 81 | 51 | 31 |
| 1.8 | 0.167 | 0.68 | 485 | 425 | 148 | 140 | 81 | 51 | 49 |

Tests were also carried out to determine the effect of dissolved oxygen concentration. Different levels of dissolved oxygen concentration in the waste effluent undergoing irradiation were maintained by varying the ratio of oxygen to nitrogen in the gas bubbled through the test solution during irradiation. Three different gas compositions were employed:

(1) 0% oxygen—100% nitrogen.
(2) 40% oxygen—60% nitrogen.
(3) 100% oxygen—0% nitrogen.

The irradiation was carried out with the test solution at a pH of 11.1, at a dose rate of 0.171 megarads/hr. for a total dosage of 0.69 megarads and at a nominal 100:1 dilution. The results of these tests are set forth in Table VIII.

of a 500:1 dilution. The results of these tests are set forth in Table X.

TABLE X

Effect of Dose Rate on Radiation-Induced Changes in the Waste

| Dose rate, megarads/hr. | Approximate dilution | Total dose, megarads | COD, mg./l. $O_2$ | | Dye, mg./l. | |
|---|---|---|---|---|---|---|
| | | | Initial | Final | Initial | Final |
| .064 | 500:1 | .134 | 97 | 79.5 | 19.5 | 2 |
| .064 | 200:1 | .335 | 248 | 200 | 39 | 5 |
| .065 | 100:1 | .675 | 485 | 402 | 81 | 4 |
| .064 | 50:1 | 1.35 | 972 | 780 | 162 | 7.5 |
| .167 | 500:1 | .134 | 97 | 79.5 | 19.5 | 2 |
| .167 | 200:1 | .335 | 248 | 190 | 39 | 6 |
| .169 | 100:1 | .675 | 485 | 381 | 81 | 4 |
| .167 | 50:1 | 1.35 | 972 | 674 | 162 | 5 |
| .334 | 500:1 | .134 | 97 | 77.5 | 19.5 | 3 |
| .334 | 200:1 | .335 | 248 | 192 | 39 | 6 |
| .339 | 100:1 | .675 | 485 | 400 | 81 | 5 |
| .334 | 50:1 | 1.35 | 972 | 703 | 162 | 9.5 |

TABLE VIII

Effect of Dissolved Oxygen Concentration on Radiation-Induced Changes in the Waste

| Gas composition, percent oxygen | COD mg./l. $O_2$ | | TOC, mg./l. C | | Dye, mg./l. | | BOD, mg./l. $O_2$ |
|---|---|---|---|---|---|---|---|
| | Initial | Final | Initial | Final | Initial | Final | |
| 0 | 485 | 403 | 148 | 128 | 81 | 29 | 32 |
| 40 | 485 | 378 | 148 | 132 | 81 | 15 | 50 |
| 100 | 485 | 376 | 148 | 130 | 81 | 13 | 52 |

Tests were carried out to determine the effect of the presence of a metal cation having more than one oxidation state, such as iron. In these tests 1 gram of ferrous sulfate was incorporated in 1200 ml. of 100:1 dilution waste effluent before irradiation. This amount of ferrous sulfate is equal to a concentration of $4.3 \times 10^{-3}$ gm. mols per liter. The pH during irradiation was 1.9 and 100% oxygen was bubbled through the test solutions. During irradiation at a dose rate of 0.165 megarad/hr. and at a total dosage of 0.66 megarad, the dye concentration in the waste decreased from an initial concentration of 79 mg./l. to 42 mg./l. when ferrous sulfate was present. In the absence of ferrous sulfate the irradiation under similar conditions gave a final dye concentration of 56 mg./l., 13% more based on the initial concentration.

The results reported hereinabove concerning operations in accordance with the practices of this invention indicate that the following conclusions may be drawn. As the radiation dosage increased the chemical oxygen demand, total organic carbon concentration, dye concentration and color of the waste effluent decreased. For example, after 2.56 megarads were absorbed in the waste effluent at 100:1 dilution the COD was reduced 61%, the TOC decreased 43% and substantially none of the dye and color remained. Further, as the radiation dosage increased the organic compounds remaining in the irradiated solution became more amenable to biological oxidation as evidenced by increased Warburg oxygen uptake values. When 2.56 megarads were absorbed the BOD increased to 86 mg. $O_2$/l. corresponding to a COD/BOD ratio of 2.2. The tests also indicate that the oxidation of the waste was favored by alkaline conditions during irradiation with maximum oxidation occurring at a pH of about 11.1. Further, at a pH of 11.1 and one atmosphere pressure irradiation of the waste effluent saturated with oxygen was ⅓ more effective than irradiation under deaerated conditions. The addition of $4.3 \times 10^{-3}$ gm. mols/l. of ferrous sulfate during irradiation improved the overall efficiency of dye degradation in the waste by 13%, probably through increased hydroxyl radical formation due to the interaction of the ferrous iron with irradiation produced hydrogen peroxide.

As will be apparent to those skilled in the art in the light of the foregoing disclosure, many modifications, alterations and substitutions are possible in the practice of this invention without departing from the spirit or scope thereof.

We claim:

1. A method of treating an aqueous waste effluent containing azo dyestuff material dissolved therein to decolorize said effluent and to render those organic compounds remaining in said effluent after treatment more biodegradable which comprises adjusting the pH of said aqueous waste effluent to a value in the range from about 9 to about 12, introducing a water-soluble salt of a multivalent metal into said effluent, subjecting said effluent to penetrative ionizing radiation and introducing an oxygen-containing gas into contact with said effluent while said effluent is being subjected to penetrative ionizing radiation.

2. A method in accordance with claim 1 wherein said effluent also contains chloride ions.

3. A method in accordance with claim 1 wherein said penetrative ionizing radiation is gamma radiation.

4. A method in accordance with claim 1 wherein said water-soluble salt of a multivalent metal is ferrous sulfate.

References Cited

UNITED STATES PATENTS

| 2,738,429 | 3/1956 | Goldblith | 204—157.1 |
| 3,147,213 | 9/1964 | Byron et al. | 204—157.1 |

FOREIGN PATENTS

| 595,264 | 3/1960 | Canada | 204—157.1 |
| 330,145 | 5/1958 | Switzerland | 210—1 |

OTHER REFERENCES

Weiss, Nature, vol. 153 (June 17, 1944), pp. 748–750.

HOWARD S. WILLIAMS, Primary Examiner

U.S. Cl. X.R.

204—158